United States Patent Office 3,336,129

Patented Aug. 15, 1967

1

3,336,129

PLANT GROWTH MEDIUM

Richard A. Herrett, Raleigh, N.C., and Paul A. King, Warwick, N.Y., assignors to Union Carbide Corporation, a corporation of New York No Drawing. Filed Mar. 22, 1963, Ser. No. 267,315
17 Claims. (Cl. 71—92)

The present invention relates to novel plant growth modifiers. More particularly, the present invention relates to novel formulations for modifying plant growth. The novel formulations include soil and/or known active agents or agricultural chemicals incorporated within or admixed with insoluble crosslinked polymeric materials.

It is an object of the present invention to provide an improved growth medium formulation which aids germination of seeds, contributes to growth of young plants and seedlings which are rendered more resistant to moisture stress, reduces the tendency of easily compacted soils to suffer aeration loss, loss of nutrient permeation and moisture permeation, aids growth of plant life in water-deficient soils, more efficiently utilizes natural plant nutrients already present in the soil, more efficiently utilizes fertilizers added to soils, decreases loss of transplanted seedlings, and more efficiently utilizes plant growth modifying agents and plant protectants such as fungicides, insecticides, nematocides, and the like.

It is another object of the present invention to provide improved formulations containing active plant growth modifiers which formulations permit more efficient use of active plant growth modifiers in foliage applications, foliage spraying techniques, subsurface spraying techniques and soil and root applications.

It is a further object of this invention to provide a process for promoting the survival and growth of plants by contacting the plants with the improved growth media and/or active plant growth modifiers of this invention.

The plant growth media of the present invention comprise minor amounts (generally on the order of from about 0.001 weight percent to about 5 weight percent or greater) of particulate insoluble crosslinked polymeric materials in admixture with major amounts of natural growth media. Natural growth media include soil, sand, peat moss and/or vermiculite. In addition, the present novel plant growth medium may alternatively contain active agents, such as water, fertilizer, herbicides, fungicides, nematocides and/or insecticides; soil conditioning agents, such as sawdust and synthetic soil conditioning agents such as polyelectrolytes as well as known diluents.

The activated carriers of the present invention comprise an active agent incorporated into the matrix of an insoluble crosslinked polymeric carrier. In addition, the activated carrier may alternatively contain or be admixed with known diluents, wetting agents, and surfactants. Further, the activated carriers themselves, without the addition thereto of soil or other natural growth media are amenable for use as growth media, especially in rooting of plant cuttings and germination of seeds.

The compositions of the present invention comprise two general classes, namely growth media and activated carriers. In general, the growth media contain at least soil and the crosslinked polymeric materials disclosed hereinafter as essential components. The activated carriers of the present invention comprise the crosslinked polymeric materials disclosed hereinafter acting as carriers for active agents. The active agents are an essential component in the activated carriers of the present invention. The activated carriers can be and often will be used in preparing the growth medium formulations of the present invention.

2

The growth media which comprise the crosslinked polymeric materials and soil can also include water and other active agents such as fertilizers, herbicides, promoters of root growth and plant protectants such as nematocides, fungicides and/or insecticides for example. These active agents can be incorporated into the soil of the growth medium either as separate components or they can be preloaded on the polymeric material prior to incorporation into the soil in preparing the present novel growth medium. If the active agents are incorporated into the polymeric material prior to application to the soil the polymeric material acts as a carrier within the standard definition of the term carrier as used in the agricultural chemical art. It is therefore readily apparent that the growth medium can be prepared by adding active agents and the crosslinked polymeric materials separately to soil and/or other natural growth media, or the growth medium can be prepared by adding the activated carriers of the present invention to soil or other natural growth media.

Any insoluble polymeric materials having the following characteristics are operable in the present invention: they are non-toxic to plant life; they structurally are a matrix of cross-linked polymers of the type described below; they are generally insoluble in water and organic solvents at ambient or elevated temperature; they will swell upon contact with liquids, solutions and suspensions by incorporating the liquids, solutions and/or suspensions into the polymeric matrix of the material; they will retain liquids and solutions incorporated into their matrix and will release the same to an environment which has a lower concentration of such liquids or solutions than that concentration of the liquid or solution within the polymeric matrix; they will incorporate liquids and solutions from the surrounding environment when the concentration of such liquids and solutions in the surrounding environment is greater than the concentration of the same within their polymeric matrix and the liquids and solutions are releasable from the polymeric matrix by evaporation.

Thus, the operable polymeric materials useful in the present invention can be characterized as follows:

(a) comprised of a matrix of cross-linked polymers
(b) non-toxic to plant life
(c) generally insoluble in water and organic solvents
(d) ability to reversibly sorb and desorb substantial amounts of liquids, solutions and suspensions into the polymeric matrix.

Illustrative of the operable polymeric materials useful in the present invention are:

Water insoluble homopolymers of ethers and substituted ethers, including alkylene ethers and hydrocarbon substituted alkylene ethers, such as poly(ethylene oxide), poly(propylene oxide), poly(butylene oxide), poly(styrene oxide) and the like;

Water insoluble copolymers and terpolymers of ethers and substituted ethers, including alkylene ethers and hydrocarbon substituted alkylene ethers, such as copolymers of ethylene oxide and propylene oxide, copolymers of ethylene oxide and 1,2-butylene oxide, copolymers of ethylene oxide and styrene oxide, copolymers of propylene oxide and styrene oxide, copolymers of propylene oxide and 2,3-butylene oxides, copolymers of 1,2-butylene oxide and styrene oxide, terpolymers of ethylene oxide, styrene oxide and 1,2-butylene oxide, and the like. The preferred copolymers and terpolymers are those which comprise at least 75 mol percent ethylene-oxy units with the remaining 25 mol percent made up of one or more of the units propylene-oxy, butylene-oxy and styrene-oxy.

Water insoluble homopolymers of vinyl compounds, such as poly(vinyl acetate), poly(vinyl pyrrolidone), polyacrylamide, and the like.

Water insoluble copolymers of vinyl compounds, such as copolymers of vinyl acetate and N-methyl-N-vinyl-acetamide, copolymers of acrylamide and acrylic acid, copolymers of vinyl alcohol and vinyl acetate, and the like.

Water insoluble homopolymers and copolymers of alkylene and hydrocarbon substituted alkylene ethers are particularly useful because of their ability to sorb water and aqueous solutions in amounts on the order of 9 to 100 times their dry weight.

The insoluble polymeric matrices can be prepared by a number of methods including chemical crosslinking and crosslinking induced by ionizing radiation. Particular methods of rendering various polymeric materials insoluble and possessive of the aforementioned characteristics is not in itself a criterion by which certain materials are judged to be operable in the present invention; that is, any insoluble polymeric material possessing the aforementioned characteristics is amenable for use in the present invention regardless of the manner in which it is produced. By the same token, it has been found that transformation of polymeric materials into insoluble polymeric materials capable of incorporating and retaining liquids, solutions and/or colloids into their matrix can be conveniently accomplished when the polymers are in solution. In general, the transformation in solution of a given soluble starting polymer into insoluble polymeric material, comprised of a matrix formed of inter molecularly and intra molecularly bonded polymers, causes formation of a matrix which will incorporate much larger amounts of liquid, and/or suspensions than a matrix comprised of the same insoluble polymeric material but produced by other methods. The particular mechanism for transformation of the starting polymer, while in solution, into insoluble polymeric material does not in any way exclude the insoluble polymeric materials from use in the present process. The mechanisms for causing the polymeric material to become insoluble or to come out of solution as gel-like materials include direct inter and intra-molecular chemical bonding of the polymer molecules such as carbon to carbon crosslinking.

The water insoluble polymers useful in this invention can be conveniently prepared by utilizing ionizing radiation. It is well known that polyvinyl alcohol, polyvinyl pyrrolidone, polyacrylamide and polyacrylic acid can be cross-linked with ionizing radiation by carbon to carbon bonding to produce water insoluble gel-like materials. Crosslinking of polyethers, including homopolymers, copolymers and terpolymers can also be carried out utilizing ionizing radiation.

As used herein, the term "ionizing radiation" includes that radiation which has sufficient energy to cause electronic excitation and/or ionization in the polymer molecules and solvent molecules (where a solvent is employed) but which does not have sufficient energy to affect the nuclei of the constituent atoms. Convenient sources of suitable ionizing radiation are gamma ray producing radioactive isotopes such as $Co^{60}$ and $Cs^{137}$, spent nuclear fuel elements, X-rays, such as those produced by conventional X-ray machines, and electrons produced by such means as Van de Graff accelerators, linear electron accelerators, resonance transformers and the like. Suitable ionizing radiation for use in the present invention will generally have an energy level in the range from about 0.05 mev. to about 20 mev.

The irradiation of the non-crosslinked polymers can be carried out in the solid phase or in solution. Solid polymers can be irradiated in the air, in a vacuum, or under various gaseous atmospheres, while irradiation in solution can be carried with the polymer dissolved in water, in conventional organic solvents, or in mixtures of water and water miscible organic solvents. Any conventional method can be used to bring the solid poly(ethylene oxide) or poly(ethylene oxide) solution into contact with the ionizing radiation. Suitable methods are well known and understood by those skilled in the art.

The exact amount of ionizing radiation to which the polymers must be subjected depends on a number of variables. In general, when irradiation is carried out at relatively low rates and in the presence of free radical scavengers, such as oxygen, extremely high total doses are required to produce the water insoluble materials useful in this invention. On the other hand, when the irradiation is carried out under conditions which favor the relatively long existence of the free radicals produced, as for example, when the irradiation is carried out with a high dose rate, in the absence of oxygen, or in solution where oxygen is rapidly used up, the formation of water insoluble polymeric materials useful in this invention takes place readily. The preferred method for producing the water insoluble polymers useful in this invention which have the highest water absorptive capacity is to carry out the irradiation on an aqueous solution of the polymer while employing ionizing radiation having an energy level in the range of about 0.05 mev. to about 20 mev. at a total dose of between about 0.05 and 10 megarads.

Production of the insoluble polymeric material by submission of the solutions of polymers to ionizing radiation comprises preparing a homogeneous water solution of the starting polymeric materials, submitting the solution to ionizing radiation for a period of time sufficient to cause the formation of a gel-like material, removing the water from the gel-like material and recovering the dry residue. The product produced by irradiation of the starting polymers in a water solution is a gel-like material reversibly holding large amounts of water. The water is then removed by known processes such as evaporation under low pressures and/or elevated temperatures to leave a solid de-watered residue.

The water loaded or de-watered solid polymeric phase can, if desired, be subdivided into particles of small size by known processes such as normal grinding operations and grinding the polymeric material at low temperatures.

Illustrative of the above-described method for preparing polymers useful in this invention, separate distilled water starting solutions of poly(vinyl alcohol), poly (vinyl-pyrrolidone), polyacrylamide, a copolymer of acrylamide and acrylic acid, and a coplymer of propylene oxide and ethylene oxide were prepared by admixing 100 grams of each of the afore-mentioned polymers with 900 ml. of distilled water. The starting solutions were subjected to ionizing radiation from a $Co^{60}$ gamma ray source until they had absorbed $2.4 \times 10^6$ rads of energy to produce water insoluble gel-like materials comprising water-insoluble polymeric matrices retaining approximately 9 times their weight in water in each instance. The gel-like materials were dried until substantially all their contained water was removed, and were then ground in the presence of liquid nitrogen to a fine particulate form.

A further illustration of the above-described method comprised preparation of a solution of water soluble poly(ethylene oxide) containing two weight percent polymer. The solution was then irradiated with gamma rays from a $Co^{60}$ source until the material had adsorbed about $8 \times 10^5$ rads to produce a water-insoluble gel-like material comprising a water insoluble poly(ethylene oxide) matrix retaining about fifty times its weight in water. This gel-like material was dried and ground in the presence of liquid nitrogen to a fine particulate form.

The active agents of the formulations of the present invention are in general known in the art. For the purpose of this disclosure and the appended claims, the term "active agent" is defined to mean those materials, organic, inorganic, organo-metallic or metallo-organic, which when in contact or close association with plants will alter, modify, promote or retard their growth either directly or indirectly.

The active agents of the present invention include water; fertilizers, including all elements and combinations of elements essential for the growth of plants in either organic or inorganic forms, solid, liquid or gaseous; algaecides, including quaternary ammonium salts, technical abiethylamine acetates, and copper sulfate; bactericides, including quaternary ammonium salts, antibiotics, and n-chlorosuccinimide; blossom thinners, including phenols; defoliants, including phosphorotrithioates, phthalates, phosphorotrithioites and chlorates; fumigants, including dithiocarbonates, cyanides, dichloroethyl ether, and halogenated ethanes; fungicides, including lime, sulfur, antibiotics, mono- and di-thiocarbamates, thiodiazines, sulfonamides, phthalimides, petroleum oils, naphthoquinones, benzoquinones, disulfides, thiocarbamates, mercuric compounds, tetrahydrophthalimides, arsenates, cupric compounds, guanidine salts, triazines, glyoxalidine salts, quinolinium salts, and phenylcrotonates; germicides, including quaternary ammonium salts, phenolics, quaternary pyridinium salts, peracids, and formaldehyde; herbicides, including sulfamates, trazines, borates, alpha haloacetamides, carbamates, substituted phenoxy acids, substituted phenoxy alcohols, halogenated aliphatic acids and salts, substituted phenols, arsonates, substituted ureas, phthalates, dithiocarbamates, thiolcarbamates, disulfides, cyanates, chlorates, xanthates, substituted benzoic acids, n-1-naphthylphthalamic acid, allyl alcohol, amino triazole, hexachloroacetone, maleic hydrazide, and phenyl mercuric acetate; insecticides, including natural products (such as pyrethrin), arsenicals and arsenites, fluosilicates and alminates, benzoates, chlorinated hydrocarbons, phosphates, cresosote oil and cresylic acid, phosphorothionates, thiophosphates, phosphonates, phosphoro-mono- and dithioates, xanthones, thiocyano-diethyl ethers, fluorophosphines, pyrrolidines, phosphonous anhydride, thiazines, carbamates, chlorinates, terpenes, tartrates, thallous sulfate, and anabasis; miticides, including sulfonates, sulfites, azobenzines diimides, benzilate, sulfides, phosphoro-dithioates, substituted phenols and salts, chlorophenyl ethanols, phosphonates, oxalates, sulphones, chlorophenoxy methanes, selenates, and strychnine; nematocides, including halogenated propanes and propenes, dithiocarbamates, phosphorothioates, and methyl bromide; insect repellents, including polypropylene glycols, succinates, phthalates, furfurals, asafetida, ethylhexanediol, and butyl mesityl oxide; rodenticides, including 2-chloro-4-dimethylamino-6-methyl pyrimidine, fluorides, coumarins, phosphorus, red squill, arsenites, and indandion; and synergists, including carboximides, piperonyl derivatives, and sulfoxides.

The present novel plant growth modifier in addition to the aforementioned active agents can, if desired, include one or more diluents, that is, materials which have substantially no effect directly or indirectly on plant growth. The liquid diulents include water, hydrocarbon oils, organic alcohols, ketones, and chlorinated hydrocarbons. The solid diluents include bentonite, pumice, china clays, attapulgites, talc, pyrophyllite, quartz, diatomaceous earth, fuller's earth, chalk, rock phosphate, sulfur, acid washed bentonite, precipitated calcium carbonate, precipitated calcium phosphate, colloidal silica, sand, vermiculite, and finely ground plant parts, such as corn cobs. The formulations can, if desired, include wetting agents such as anionic wetting agents, non-ionic wetting agents, cationic wetting agents, including alkyl aryl sulfonates, polyethylene glycol derivatives, conventional soaps, amino soaps, sulfonated animal, vegetable and mineral oils, quaternary salts of high molecular weight acids, rosin soaps, sulfuric acid salts of high molecular weight organic compounds, ethylene oxide condensed with fatty acids, alkyl phenols and mercaptans.

The plant growth medium formulation comprises soil and the particulate crosslinked polymeric materials of the present invention. The polymeric material can be applied to the surface of the soil or incorporated into the soil to form a mixture of soil and crosslinked polymeric materials. Numerous variations of the basic formulation are possible. For instance, the growth medium can comprise a mulch of soil and dry particulate crosslinked polymeric material per se. The polymeric material will sorb water during heavy rainfall or other water applications and retain the water over extended water deficient periods. The polymeric material can be added to dry soils or mulched therewith near plant root systems to sorb any water in the surrounding dry soil and concentrate the water in the vicinity of the plant roots where it is required to sustain plant life. The sorption of water by the polymeric materials prevents excessive loss of water to the natural water table level. Naturally occurring nutrients in the soil are solubilized in the soil water and also sorbed by the polymeric materials; here the polymeric material acts as a carrier for natural nutrients. This prevents leaching of natural nutrients from the soils. Other advantages achieved by adding the dry polymeric materials per se to soils include a reduction of compaction of soil thereby increasing the penetration of moisture and oxygen into the subterranean growing areas.

Water can be incorporated within the polymeric matrix prior to application of the polymeric matrix to the soil. In these applications, the water is supplied from the polymeric reservoir for efficient use by plant life as needed. In these applications, the polymeric material is a carrier for water. There is no excessive water loss due to evaporation as experienced with some of the sandy soils. A fertilizer or other active agent can be incorporated into the polymeric matrix with water and/or organic solvents prior to addition of the polymeric materials to the soil. The polymeric material then acts again as a reservoir and a carrier for the water, fertilizer or other active agent and prevents excessive loss of the water, fertilizer and other active agents by leaching.

A fertilizer or other active agents can be first solubilized in water and/or organic solutions and the polymeric materials can then be exposed to these solutions. The solutions containing the active agent will thereby be incorporated into the polymeric matrix. The water or organic solvent can then be removed from the polymeric matrix, prior to application of the polymeric material to the soil, to form a substantially dry polymeric carrier containing only the active agent. This active-agent-loaded polymeric material or growth modifier can then be added to soil to produce the growth medium formulations of the present invention. As water is applied to the soil, the polymeric carrier will sorb the water. The active agents contained in and on the polymeric material will be solubilized therein. The polymeric material will then act as a reservoir and carrier for water and active agents which are readily available to modify plant growth. The active agents will not be leached from the soil by excessive rainfall or during other abrupt or extended applications of water. This aspect of the present invention has great utility as a means of adding herbicides simultaneously with seeding operations without undue loss of herbicide because of leaching.

The polymeric materials can be admixed or mulched with the soil in dry or substantially dewatered condition along with substantially dry active agents such as fertilizers, herbicides, nematocides and insecticides, for example. Upon application of water to the soil the active agents will be solubilized and the water and active agents will be sorbed by the polymeric matrix. Again, the problem of excessive loss of water by evaporation or by loss to the natural water table and loss of the active agents by leaching is obviated. Also, because the activating carrier is able to sorb moisture from the so-called dry soils, activation of active agents will begin without additional rainfall.

A particular and distinct advantage of the present growth medium is the manner in which the plant roots make use of the polymeric material. The plant roots grow into the polymeric matrix itself and thereby come into direct contact with water and the other active agents incorporated within the polymeric matrix. The ability of the plant roots to grow into the polymeric matrix permits more efficient utilization of water and other active agents because the water and active agents are directly contacted by the roots. Also, plants whose roots grow into the polymeric matrix, thereby causing the crosslinked polymeric matrix to cling to the plant roots, are much more resistant to extended periods of moisture stress. The term "moisture stress" is defined herein to mean a situation wherein the internal moisture of the plant is transpired or evaporated at a rate greater than the rate which water enters the plant. The latter rate is due primarily to the lack of available moisture. There is much less destruction of seedlings during shipping and transplating operations with such plants as tobacco, tomatoes, strawberries, annuals and perennials, holding perennials, woody plants, ornamentals and seedlings when they have been grown in the soil-polymeric formulations of the present invention.

In a preferred embodiment of this invention, plants can be rendered more resistant to moisture stress by contacting the roots with an aqueous slurry of one of the particulate crosslinked polymeric materials useful in this invention. The roots can be contacted with the slurry by spraying, dipping, or other convenient method. For example, 400 grams of water insoluble crosslinked poly(ethylene oxide) was added to a mixture of 100 pounds of water and 100 grams of water-soluble poly(ethylene oxide), the latter serving as a thickening agent, and the combined mixture allowed to stand overnight. The resulting slurry of swollen polymer gel was then stirred vigorously and an additional 60 grams of water soluble poly(ethylene oxide) thickening agent was added. Young tomato plants were then uprooted, shaken to remove loose dirt from the roots, dipped in the aqueous slurry of water insoluble crosslinked poly(ethylene oxide), and stored at about 50% relative humidity and about 55° F. to 75° F. for 10 days. Control plants were uprooted, shaken and stored under the same conditions of humidity and temperature. At the end of the 10 day storage period, both the test plants and control plants were replanted in the ground. Almost all of the replanted test plants were turgid and strong while almost all of the replanted control plants drooped badly.

The following Table I indicates the results of a group of experiments conducted to ascertain the relative resistance of young plants to moisture stress when grown in the growth medium of the present invention as contrasted with growth of similar plants in soil which did not contain the polymeric materials disclosed herein. A control group of tomato seedlings was planted in soil containing no crosslinked polymeric material. Tomato seedlings of a comparable size were also planted in soil containing approximately 0.25 weight percent crosslinked poly(ethylene oxide). The seedlings were allowed to grow in these soils for a period of 41 days. At the end of the period, the plants were uprooted from the soil, the soil was washed off the roots and the plants were exposed to a temperature of about 80° F. and a relative humidity of 54 percent out of contact with soil or water for various periods ranging up to about six hours. The weight loss of the plants was measured at hour intervals. After the fourth hour, the roots of the control plants were placed in water and after six hours the roots of the plants grown in the polyethylene oxide containing soil were immersed in water. Recovery of the plants after immersion in the water was noted. Recovery is indicated as a percentage of the number of plants which did not die. Table I shows data resulting from four such replications at one plant per replicate.

TABLE I.—WEIGHT LOSS PER PLANT IN PERCENT AFTER REMOVAL FROM SOIL

| | 1st hr. | 2nd hr. | 3rd hr. | 4th hr. | 5th hr. | 6th hr. | Percent Recovery |
|---|---|---|---|---|---|---|---|
| Control | 28.0 | 37.1 | 44.9 | 50.6 | | | None. |
| Soil containing 0.25 wt. percent poly(ethylene oxide). | 15.9 | 26.8 | 36.9 | 45.9 | 49.7 | | Complete. |

It is significant to note that there was no recovery whatsoever on the control plants. The plants growing in the poly(ethylene oxide) containing soil showed complete recovery even though they were submitted to an additional two hours of moisture stress.

A similar experiment conducted on tobacco plants, which plants are noted for their resistance to moisture stress, indicated much greater recovery of the tobacco plants after subjection to moisture stress when the plants were grown in soil containing poly(ethylene oxide). The results of the average of four replications at one plant per replication on 2 inch tobacco transplants are shown in Table II. The plants were treated in the same manner as used in securing the data on tomato plants for Table I. All the plants were placed in water after the third hour.

TABLE II.—WEIGHT LOSS PER PLANT AFTER REMOVAL FROM SOIL IN PERCENT

| | 1st hr. | 2nd hr. | 3rd hr. | Percent Recovery |
|---|---|---|---|---|
| Control | 37.9 | 45.2 | 52.6 | Complete. |
| Soil containing 0.25 wt. percent crosslinked poly(ethylene oxide). | 11.5 | 38.4 | 45.9 | Do. |

The plants grown in soil containing poly(ethylene oxide) showed much less loss of water during the moisture stress period.

Moisture stress experiments conducted in the same manner as described in securing the data for Table I were also conducted on 6–8 inch tobacco plants. In this experiment exposure times under moisture stress were increased up to about 5 hours and the temperature and humidity during exposure to moisture stress were maintained at 91° F. and 40 percent relative humidity. The plant roots were immersed in water after 7 hours' exposure. The results of these experiments are recorded in Table III as the average of three replications at one plant per replicate.

TABLE III.—WEIGHT LOSS IN PERCENT PER PLANT AFTER REMOVAL FROM THE SOIL

| | 4.0 hrs. | 4.5 hrs. | 5.0 hrs. | Percent Recovery after 24 hrs. in $H_2O$ |
|---|---|---|---|---|
| Control | 53 | 53 | 61 | 84 |
| Soil containing 0.25 wt. percent crosslinked poly(ethylene oxide) | 42 | 43 | 45 | 100 |

The data in Table III secured after a longer period of moisture stress clearly show that the tobacco plants grown in crosslinked poly(ethylene oxide) containing soils are much more resistant to moisture stress.

The weight of the tobacco plants and leaf damage of the tobacco plants which survived the treatment used in securing the data for Table III are shown in Table IV.

TABLE IV.—PHYSICAL MEASUREMENTS AND LEAF DAMAGE OF TOBACCO PLANTS

| | Weight of Surviving Plants | Percent of Plants having Leaf Damage | | |
|---|---|---|---|---|
| | | None | Moderate | Severe |
| Control | 76.5 | 4 | 10 | 86 |
| Soil containing 0.25 wt. percent crosslinked poly(ethylene oxide) | 84.0 | 43 | 47 | 10 |

The plants grown in the control wherein no crosslinked poly(ethylene oxide) was used in the soil formulation had approximately ten times more leaves which suffered some damage and approximately eight times more leaves which suffered serious damage.

After the 6–8 inch tobacco plants utilized in the tests for securing the data in Table III above had been exposed to water for a period of 24 hours they were planted in normal soil containing no crosslinked poly(ethylene oxide) and in a soil formulation contaning 0.25 weight percent crosslinked poly(ethylene oxide). Their percent survival was noted after watering with 200 ml. in one instance and 300 ml. of water in another instance. The survival results are summarized in Table V.

TABLE V.—SURVIVAL OF TOBACCO PLANTS TRANSPLANTED IN SOIL

| | Water Added (ml.) | Survival (Percent) |
|---|---|---|
| Control | 200 | 42.9 |
| Soil containing 0.25 wt. percent crosslinked poly(ethylene oxide) | 200 | 71.4 |
| Control | 300 | 85.7 |
| Soil containing 0.25 wt. percent crosslinked poly(ethylene oxide) | 300 | 100.0 |

The data in Table V indicate that though survival of tobacco plant can be somewhat increased by application of more water, in all instances there is much greater survival with much less use of water if the seedlings are grown in soil formulations containing crosslinked poly (ethylene oxide) prior to transplanting into normal soil. Of course, the mere addition of more water will not decrease the leaf damage experienced by the control plants as shown in Table IV.

To further investigate the advantage of growing plants in the growth media of the present invention, field tests were conducted on tomato plants to determine the extent of survival in transplanted tomato plants and the extent to which the present novel growth medium affected the survival rate of tomato plants. Tomato plant seedlings were grown in soil containing 0.64 gram of crosslinked poly(ethylene oxide) per plant and soil containing no crosslinked polyethylene oxide until they reached a height ranging from about 18 to about 24 inches. The plants were then removed from the soil and all the soil was washed from the roots. The roots of the plants grown in soil formulations containing crosslinked poly(ethylene oxide) had adhered thereto particles of the polymeric matrix and even after washing the soil from the roots, a substantial amount of the polymeric matrix remained adhered to the plant root system. The plants were then subjected to moisture stress at 80° F. and 54 percent relative humidity for various periods and then transplanted in soils which did not contain crosslinked polymeric materials. The transplanted tomatoes were irrigated with 1 gallon of water per ten plants five hours after transplanting and were not irrigated again until 3 days after transplanting.

The percent survival was measured for each plant three days, five days and thirty-one days after transplanting. Table VI shows this effect. The data in Table VI are the result of the average of two replications at ten plants per replicate. Additional measurements of plant height and root weight were made on the plants which survived a period of forty-six days from the day of transplanting. These data are shown in Table VII. The data are the average of two replications of plants surviving in each replicate.

TABLE VI.—SURVIVAL OF TRANSPLANTED TOMATO SEEDLINGS

| Growth Medium Formulation in Which Seedlings Grown | Duration of Moisture Stress | Survival (Percent) Days After Transplanting | | |
|---|---|---|---|---|
| | | 3 | 5 | 31 |
| Untreated Control (soil only) | No drying | 70 | 70 | 45 |
| Soil containing crosslinked poly(ethylene oxide). | do | 95 | 90 | 85 |
| Untreated Control (soil only) | 1 hour drying | 40 | 40 | 40 |
| Soil containing crosslinked poly(ethylene oxide). | do | 95 | 95 | 95 |
| Untreated Control (soil only) | 2 hours drying | 45 | 31 | 31 |
| Soil containing crosslinked poly(ethylene oxide). | do | 75 | 75 | 70 |

COMBINED COMPILATION OF TABLE VI DATA SURVIVAL OF TRANSPLANTED TOMATO SEEDLINGS

| Growth Medium Formulation in Which Seedlings Grown | Survival (Percent) Days After Transplanting | | |
|---|---|---|---|
| | 3 | 5 | 31 |
| Untreated Control (soil only) | 51.7 | 47.0 | 38.7 |
| Soil containing crosslinked poly(ethylene oxide) | 88.3 | 86.7 | 83.3 |

TABLE VII.—PHYSICAL MEASUREMENTS OF TRANSPLANTED TOMATO SEEDLINGS

| Growth Medium Formulation in Which Seedlings Grown | Drying Treatment | Height of Plant (inches) | Growth as Measured by Weight of Plant (gm.) | Weight of of Roots (gm.) |
|---|---|---|---|---|
| Untreated control (soil only) | None | 26.75 | 112.95 | 9.10 |
| Soil containing crosslinked poly-(ethylene oxide). | do | 31.90 | 234.75 | 24.20 |
| Untreated Control (soil only) | 1 hour | 29.20 | 158.00 | 13.60 |
| Soil containing crosslinked poly-(ethylene oxide). | do | 32.10 | 198.45 | 21.60 |
| Untreated Control (soil only) | 2 hours | 28.00 | 112.85 | 11.65 |
| Soil containing crosslinked poly-(ethylene oxide). | do | 32.75 | 168.50 | 14.05 |

COMBINED COMPILATION OF TABLE VII DATA

| | Height of Plant (inches) | Growth as Measured by Weight of Plant (gm.) | Weight of Roots (gm.) |
|---|---|---|---|
| Untreated Control (soil only) | 27.98 | 127.93 | 11.45 |
| Soil containing crosslinked poly(ethylene oxide) | 32.25 | 200.90 | 19.95 |

The data in Table VI indicate that the seedlings grown in the crosslinked poly(ethylene oxide) containing soil formulations had a much greater percentage of survival over various periods from the date of transplanting and under various moisture stress conditions than the seedlings grown in the control flats wherein no crosslinked polymeric materials were incorporated in the growth medium formulations. The seedlings grown in the control flats generally had from 25–45 percent less survival when subjected to no drying, about 45 to 55 percent less survival when subjected to 1 hour of drying and 30 to 39 percent less survival when subjected to two hours of drying prior to transplanting.

The data in Table VII clearly indicate that of the plants which were still living 46 days after transplanting, the plant seedlings which had been grown in soil formulations containing crosslinked poly(ethylene oxide) had much more height, weight and a larger root structure.

The aforementioned test conditions used in securing the data shown in Tables VI, VII and VIII were repeated with tomato plants measuring approximately 8–12 inches in height. In these tests the plants were subjected to moisture stress for a period of two and one-half hours at 80° F. and 54 percent relative humidity prior to transplanting. The percent survival of these plants was observed at five to nine days after transplanting. These results are shown in Table VIII. The data in Table VIII are the result of an average of four replications at ten plants per replication.

TABLE VIII.—SURVIVAL OF TOMATO PLANTS WITH AND WITHOUT CROSSLINKED POLYETHYLENE OXIDE TRANSPLANTED IN THE FIELD

| Growth Medium Formulation in which Seedling Grown | Drying Treatment | Survival (Percent) Days after Transplanting | |
|---|---|---|---|
| | | 5 | 9 |
| Untreated Control (soil only) | None | 100 | 100 |
| Soil containing crosslinked poly-(ethylene oxide). | do | 100 | 100 |
| Untreated Control (soil only) | 2.5 hours | 55 | 42.5 |
| Soil containing crosslinked poly-(ethylene oxide). | do | 97.4 | 97.4 |

The data in Table I–VIII clearly indicate several advantages achieved when the novel growth medium formulations of the present invention are employed. Plant seedlings are much more resistant to moisture stress. This is true both for plants having large root systems such as tomatoes as well as for plants having relatively small root systems such as tobacco. Plant seedling loss on transplanting can be greatly reduced. The amount of water required to prevent plant seedling loss is reduced. Growth of plant stems, leaves and roots is greatly accelerated after transplanting if the plants are started and grown to the seedling stage in soil containing the crosslinked polymeric material of the present invention. The seedlings grown in the soil formulation of the present invention contain root systems which have intergrown into the matrix of the polymeric materials themselves.

Though the data for Tables I–VIII above were secured using crosslinked poly(ethylene oxide) as the polymeric additive, the present invention is not limited thereto. All the aforementioned insoluble polymeric materials are also suited for use in the novel soil formulations of the present invention if they possess the aforementioned requisite characteristics.

The amount of crosslinked polymeric material utilized in a particular formulation of the present growth medium will of course vary with various types of soil and the type of plant which is grown therein. Several experiments have been conducted utilizing Norfolk Sandy Loam type soil and crosslinked poly(ethylene oxide) in various amounts to grow tomato plants. The height of the tomato plants was measured after 76 days. The results of this investigation are noted in Table IX. The data in Table IX was secured by taking the average of 18 replications at one plant per replicate.

TABLE IX.—GROWTH OF TOMATOES IN SOIL CONTAINING VARIOUS AMOUNTS OF CROSSLINKED POLY(ETHYLENE OXIDE)

| Wt. percent of crosslinked poly(ethylene oxide) in soil: | Height (inches) |
|---|---|
| 0 | 8.75 |
| 0.082 | 8.86 |
| 0.123 | 10.93 |
| 0.165 | 12.21 |
| 0.207 | 12.86 |
| 0.414 | 12.30 |

A statistical analysis by the method of Wilcoxon as described in "Some Rapid Approximate Statistical Procedures" published by American Cyanamid, 1949, indicates the following:

(1) No significant difference between 0.123% and 0.165% or 0.414% crosslinked poly(ethylene oxide);
(2) Significant difference (5% level) between 0.123% and 0.207% crosslinked poly(ethylene oxide);
(3) No significant difference between 0.165%, and 0.207% and 0.414% crosslinked poly(ethylene oxide);
(4) Highly significant (1% level) between 0.082% and 0.123% crosslinked poly(ethylene oxide);
(5) Overall probability of the test being due to chance is 0.1%.

The data in Table IX indicate that the addition of crosslinked poly(ethylene oxide) to the soil provides a more favorable media for plant growth than does the soil alone. The extent of this response will vary, of course, with the type of soil employed. The precise reason for this response is believed to be a consequence of more favorable aeration, moisture and nutrient utilization, but this is not to be interpreted as limitative as to the amount of polymer utilized in the growth medium of the present invention. As mentioned above the amount of crosslinked polymeric material utilized will vary with the type plants grown and the type soil in a given locality.

The novel growth media of the present invention can also contain crosslinked polymeric materials which contain fertilizer within their matrices. The fertilizers loaded within the polymeric matrices can be in solution in water or they may be present in the matrix in the absence of water. In either alternative, the crosslinked polymeric material-fertilizer component can be mixed with soil in preparing the present novel formulation or growth medium. Following are the results of several experiments conducted to show the advantage achieved by first incorporating fertilizer containing polymeric material into soil to provide an improved plant growth medium.

Dry crosslinked poly(ethylene oxide) of a large particle size was added to a water solution of fertilizer analyzing 15% N, 30% $P_2O_5$, 15% $K_2O$, 0.3% Mg, 0.18% Mn, 0.12% Fe, 0.06% Cu, 0.06% Zn, 0.09% B, 0.008% Mo, and a residual activity equivalent to 1016 pounds of $CaCO_3$ per ton, and allowed to stand for a period of about 4–5 hours. During this time the crosslinked poly(ethylene oxide) sorbed the fertilizer and water solution into the matrices of each particle. There was a substantial swelling of the polymeric material as the fertilizer containing water solution was sorbed into the matrix of the polymeric material. The fertilizer and water containing polymeric material was then air dried to remove the water from the polymeric matrix and the dried particles were subdivided to less than about 8 mesh (Fisher Scientific Screen Series). At this point the crosslinked poly(ethylene oxide) particles contained various amounts of fertilizer within their polymeric matrix as indicated below and were substantially free of water. The dry fertilizer-loaded particles were then admixed alternatively with a soil and peat moss admixture and with soil alone in various amounts as noted in the table. The soil-peat moss admixture contained 50 volume percent peat moss and 50 volume percent soil prior to addition of the fertilizer-loaded polymeric material thereto. In addition, soils were mixed with crosslinked poly (ethylene oxide) which was not preloaded with fertilizer. In each instance controls were prepared which did not contain crosslinked poly(ethylene oxide) or the fertilizer loaded polymeric material.

Crosslinked poly(ethylene oxide) containing 55 percent by weight of fertilizer was incorporated into a soil and peat moss admixture and into soil alone in amounts sufficient to produce a growth medium containing 0.11 gram of fertilizer per pot and 1.1 grams of fertilizer per pot. In adidtion 0.09 and 0.90 gram of crosslinked poly (ethylene oxide) containing no fertilizer were incorporated in soil and soil and peat moss admixtures. Control pots were also prepared by admixing 0.11 and 1.1 grams of fertilizer with soil alone and with a soil and peat moss admixture. Tender green bean seeds were planted in each pot and watered uniformly over a period of 53 days. At the end of this period the length of the stems, number of pods, weight of the stems and weight of the roots on each plant were measured. The results of this experiment are tabulated in Table X below. The data was secured by taking the average of three replications at three plants per replicate.

TABLE X.—GROWTH OF TENDER GREEN BEANS

| No. | Type Growth Medium | Length of Stem (cms.) | Averages per Replication | | |
|---|---|---|---|---|---|
| | | | No. of Pods | Wt. of Stem (gms.) | Wt. of Root (gms.) |
| 1 | Soil alone | 21.8 | 0 | 7.3 | 3.4 |
| 2 | Soil and 0.09 gm. crosslinked poly-(ethylene oxide). | 16.9 | 1.3 | 7.0 | 4.1 |
| 3 | Soil and 0.9 gm. crosslinked poly-(ethylene oxide). | 22.7 | 0 | 7.1 | 6.9 |
| 4 | Soil and peat moss alone | 22.0 | 0.3 | 6.3 | 2.9 |
| 5 | Soil and peat and 0.09 gm. crosslinked poly(ethylene oxide). | 21.6 | 1.3 | 8.0 | 3.4 |
| 6 | Soil and peat and 0.9 gm. crosslinked poly(ethylene oxide). | 22.9 | 2.3 | 6.7 | 4.2 |
| 7 | Soil and 0.11 gm. fertilizer alone | 20.5 | 1.3 | 8.3 | 3.0 |
| 8 | Soil and 0.11 gm. fertilizer on crosslinked poly(ethylene oxide). | 25.6 | 0.3 | 8.0 | 3.0 |
| 9 | Soil and peat and 0.11 gm. fertilizer | 22.0 | 2.0 | 7.6 | 2.6 |
| 10 | Soil and peat and 0.11 gm. fertilizer on crosslinked poly(ethylene oxide). | 24.2 | 2.7 | 11.4 | 5.6 |
| 11 | Soil and 1.1 gm. fertilizer alone | 25.1 | 4.7 | 12.6 | 5.3 |
| 12 | Soil and 1.1 gm. fertilizer on crosslinked poly(ethylene oxide). | 29.8 | 1.7 | 15.7 | 7.3 |
| 13 | Soil and peat and 1.1 gm. fertilizer | 28.5 | 2.7 | 17.8 | 5.6 |
| 14 | Soil and peat and 1.1 gm. fertilizer on crosslinked poly(ethylene oxide). | 26.0 | 4.0 | 8.3 | 12.3 |

The data in Table X on runs 1–6 clearly indicate that the addition of the crosslinked poly(ethylene oxide) alone caused a definite increase in the amount of root growth in the beans. In addition, as the amount of crosslinked polymeric material was increased in the soil-peat moss medium there was an increase in the number of pods. Similar increases in the number of pods were not noted when the amount of fertilizer was increased in soil free of the crosslinked polymeric material.

The data in runs 7–10 showed increases in stem length in both the soil and the soil-peat moss mixture when the fertilizer was added as a component of the crosslinked polymeric matrix. Stem weight and root growth were also substantially increased in the plants grown in the medium containing soil and peat moss with addition of fertilizer via the crosslinked polymeric carrier. Though somewhat of a reduction in the number of pods were noted when the fertilizer was added to the soil medium in the absence of peat moss via the activating carrier this is attributed to the highly vegetative growth in these plants as indicated by the stem length and weight and most probably these plants would yield many more pods at a later harvest.

The data in runs 11–14 also show the advantage gained by adding fertilizer to the soil via the polymeric carrier. The reduction of the number of pods in these runs again attributed to the highly luxuriant vegetative growth and these plants would yield a larger number of pods at a later harvest. Root growth also increased substantially in the runs wherein the fertilizer was available to the plants from the polymeric carrier.

Experiments were also run to ascertain the influence on the growth of corn in situations wherein fertilizer was added to the soil via the polymeric carrier. Corn was planted in soils containing crosslinked poly(ethylene oxide) with no fertilizer incorporated therein. Fertilizer of the same type used in securing the data for Table X was also incorporated into the matrices of crosslinked poly(ethylene oxide) in the manner described in preparing for the tests shown in Table X. Pots were prepared which contained 0.09 gram and 0.90 gram of crosslinked poly(ethylene oxide) with no fertilizer adsorbed thereon as well as crosslinked poly(ethylene oxide) having fertilizer incorporated therein. Sufficient fertilizer-loaded polymeric carrier was supplied to the pots to incorporate 0.194 and 1.94 grams of fertilizer into various different pots. The corn seeds were planted in these pots and watered uniformly over a period of 52 days. In addition, in runs 9 and 10 a second fertilizer treatment (commonly termed a side dressing) of approximately 0.5 gram per pot was administered to the plants after germination of the corn seeds. In all cases control pots were prepared to obtain comparative results. The data in Table XI was secured by taking the average of three replications at three plants per replicate.

prepared separately containing 0.09 gram by weight and 0.90 gram by weight of crosslinked poly(ethylene oxide) and soil. Radishes were planted in these pots and also in control pots containing no crosslinked poly(ethylene oxide). The various pots were then fertilized at planting with an equal amount of the same fertilizer as employed in securing the data for Table X above and alternatively in some pots a second fertilization or side dressing was applied after about 20 days in an amount of about 0.5 gram. After 49 days, the radish root weight was measured. The results are indicated in Table XII. The data in Table XII were secured by taking the average of 3 replications at 4–6 plants per replicate.

TABLE XII.—GROWTH OF RADISHES

| No. | Type Growth Medium | Average wt. of radish in grams |
|---|---|---|
| 1 | Soil alone | 2.26 |
| 2 | Soil and 0.09 gm. crosslinked poly(ethylene oxide) | 2.80 |
| 3 | Soil alone and fertilizer at planting | 2.63 |
| 4 | Soil 0.09 gm. crosslinked poly(ethylene oxide) and fertilizer at planting. | 3.30 |
| 5 | Soil and 0.90 gm. crosslinked poly(ethylene oxide) and fertilizer at planting. | 3.30 |
| 6 | Soil alone and 2 fertilizer treatments | 4.01 |
| 7 | Soil and 0.9 gm. crosslinked poly(ethylene oxide) and 2 fertilizer treatments. | 4.86 |

In all of the runs noted in Table XII there was a substantial increase in the amount of root growth in the radish plants.

Tables X–XII clearly indicate that when fertilizer is made available to plants via the crosslinked polymeric carriers of the present invention there is a clear and substantial increase in the growth rate of the plants. This fact is evidenced by the increase in stem length, stem weight, number of fruits per plant and root weight.

The activated carriers of the present invention in addition to being especially suited for use as a carrier for fertilizers are also amenable for use as activated carriers for other active agents such as herbicides. Several experiments were conducted to show the advantages of employing the crosslinked polymeric carriers of the present invention in the application of the herbicide 2-chloro-4-isopropylamino-6-ethylamino-s-triazine, hereinafter referred to as "Herbicide A." This herbicide was dissolved in an ethanol-acetone-water mixture and to this solution was added particulate crosslinked poly(ethylene oxide). The polymer swelled by incorporating the herbicide containing mixture into its matrix. The herbicide-containing polymeric carrier was then dried to remove the solvents therefrom. The dried herbicide loaded material was then further subdivided and separated into several fractions having mesh sizes ranging from about 8 mesh to 100 mesh (Fisher Scientific Company Screen Series).

TABLE XI.—GROWTH OF CORN

| No. | Growth type Medium | Length of Stem | Wt. of Stems in grams | Wt. of Root in grams |
|---|---|---|---|---|
| 1 | Soil alone | 19.6 | 3.9 | 3.0 |
| 2 | Soil and 0.09 gm. crosslinked poly(ethylene oxide). | 27.5 | 7.9 | 2.1 |
| 3 | Soil and 0.9 gm. crosslinked poly(ethylene oxide). | 20.4 | 3.3 | 1.4 |
| 4 | Soil alone and side dressing fertilizer | 17.5 | 2.8 | 1.5 |
| 5 | Soil and 0.09 gm. crosslinked poly(ethylene oxide) and side dressing fertilizer. | 27.5 | 7.6 | 2.1 |
| 6 | Soil and 0.9 gm. crosslinked poly(ethylene oxide) and side dressing fertilizer. | 25.8 | 5.3 | 1.8 |
| 7 | Soil and 1.94 gm. fertilizer | 26.8 | 15.5 | 4.6 |
| 8 | Soil and 1.94 gm. fertilizer and crosslinked poly(ethylene oxide). | 31.8 | 20.7 | 12.6 |
| 9 | Soil and 1.94 gm. fertilizer and side dressing fertilizer. | 33.2 | 12.4 | 3.2 |
| 10 | Soil and 1.94 gm. fertilizer crosslinked poly(ethylene oxide) and side dressing fertilizer. | 31.1 | 15.9 | 5.6 |

In runs 1–6 wherein no fertilizer was incorporated into the crosslinked polyethylene oxide there was a substantial increase in stem length and weight as well as root weight in each case where the crosslinked polymeric material was used in an amount of 0.09 gm. per pot. Though runs 3 and 6 indicate there may be some optimum amount of polymeric material, this particular amount would likely vary between different type soils.

In runs 7–10 the application of ferilizer via the polymeric carrier definitely increased the length and weight of the stems and the weight of the root.

As was indicated above, the incorporation of fertilizer into the soil via the polymeric carrier consistently indicated an increase in root growth. The direct influence of this root growth response was tested on the growth of radishes which is primarily a root crop. Several pots were The polymeric carrier contained 17.5 weight percent of the herbicide. For the purpose of securing comparative results, the same herbicide in a granular form loaded on an ammonium sulfate carrier was tested. The ammonium sulfate herbicide formulation analyzed 20 weight percent 2-chloro-4-isopropylamino-6-ethylamino-s-triazine and 80 weight percent ammonium sulfate. The crosslinked polyethylene oxide carrier containing the herbicide was incorporated into soil in a soil box at one-half inch and one inch depths below the upper surface of the soil. The ammonium sulfate herbicide formulation was also incorporated into soils at the same depth. Each application was at a rate of one to two pounds per acre (lbs./A) as noted in Table XIII. The soil boxes were then set out under normal greenhouse conditions. At the end of 25 days, results were noted. The data is tabulated in Table XIII. The data shown in Table XIII were secured by taking one replication. The percent weed control was arrived at by counting the number of weeds in the center 32 square inches of each treatment and comparing this to the number of weeds observed in a similar area of the untreated control.

TABLE XIII.—HERBICIDE APPLICATION TO SOILS

| | Carrier | Depth (inches) | Rate (lb./A) | Percent Weed Control |
|---|---|---|---|---|
| 1 | Ammonium sulfate | 1 | 1 | 86.4 |
| 2 | Crosslinked poly(ethylene oxide). | 1 | 1 | 95.0 |
| 3 | Ammonium sulfate | ½ | 1 | 96.1 |
| 4 | Crosslinked poly(ethylene oxide). | ½ | 1 | 95.6 |
| 5 | Ammonium sulfate | 1 | 2 | 98.3 |
| 6 | Crosslinked poly(ethylene oxide). | 1 | 2 | 100 |
| 7 | Ammonium sulfate | ½ | 2 | 99.0 |
| 8 | Crosslinked poly(ethylene oxide). | ½ | 2 | 99.5 |

In an over-all comparison on the basis of the actual number of weed plants grown per thirty-two square inches of soil, it was found that the soils treated with herbicide on the crosslinked polymeric carrier contained only about 10 weed plants per 32 square inches in sharp contrast to the plots treated with herbicide on the ammonium sulfate carrier which contained about 20.75 plants per 32 square inches.

In addition, the same Herbicide A was applied via the ammonium sulfate and crosslinked poly(ethylene oxide) carriers and in addition by a technical spray technique. The spray technique comprises formulation of a solution of technical Herbicide A in an acetone-water solution with a wetting agent and spraying the formulation onto the surface of the soil at the desired rate (1 lb./A) in 59 gallons/A of solution. The herbicide loaded carriers were placed at a depth of one-half inch below the surface of the soil at a rate of one pound of herbicide per acre. In this experiment the herbicide carrier formulations were tested at three different moisture levels; namely, dry or minimum moisture added for plant survival; moist or addition of two times as much water to these flats than was added to the dry flats; and wet or flats to which 5 times more water was added than that added to the dry flats. In addition, a control plot untreated with the herbicide was tested for purposes of comparison. The results of this experiment are listed in Table XIV. The data in Table XIV below were secured by taking an average of two replications for each treatment.

TABLE XIV.—HERBICIDE APPLICATION TO SOILS

| Type Treatment Method | No. of Weeds Moisture Level | | |
|---|---|---|---|
| | Dry | Moist | Wet |
| Technical-spray | 26 | 7.5 | 51 |
| Ammonium sulfate carrier | 52 | 34.5 | 52 |
| Crosslinked poly(ethylene oxide) | 17 | 10.5 | 18.5 |
| Untreated controls | 396 | 346.5 | 511.5 |

The data shown in Table XIV plainly indicate that under all three conditions, that is, dry, wet and moist, the herbicide-polymeric carrier formulation was superior to the herbicide applied via the commercial ammonium sulfate carrier. The herbicide-polymeric carrier formulation was approximately equal in herbicidal affects to the technical spray application at the dry and moist levels and much superior to the technical sprayed application of the herbicide at the dry and the wet level. This points out a very important advantage of the present invention; namely, that the crosslinked polymeric carrier effectively holds the active agent in the soil and prevents loss of the active agent from a given location in the soil by leaching. These results also indicate that the crosslinked polymeric carrier effectively activated the herbicide under dry conditions. Therefore, a major problem normally encountered in semi-arid areas is obviated by the present carriers.

Particle size of the activated carrier has some effect on the effectiveness of the herbicide. Experiments were run to determine generally the relationship between the particle size of the crosslinked polymeric carrier and the effectiveness of the herbicide compositions. In this experiment, 2-chloro-4-isopropylamino-6-ethylamino-s-triazine (Herbicide A) was loaded on crosslinked poly(ethylene oxide) in the manner described above and applied to the soil at a depth of ½ inch. For purpose of comparison,

TABLE XV.—HERBICIDE ACTIVITY AS A FUNCTION OF CARRIER PARTICLE SIZE

| Treatment | Particle Size (mesh) | Rate, lbs./acre | No. of Weeds 43 days after treatment | Percent Control | No. of Weeds 84 days after treatment | Percent Control |
|---|---|---|---|---|---|---|
| (1) Herbicide A-Spray | | ½ | 33.5 | 71 | 47.5 | 52 |
| (2) Herbicide A-crosslinked poly(ethylene oxide) | 10–20 | ½ | 74.5 | 37 | 39.0 | 60 |
| (3) Herbicide A-crosslinked poly(ethylene oxide) | 20–40 | ½ | 38.5 | 67 | 28.5 | 70 |
| (4) Herbicide A-crosslinked poly(ethylene oxide) | 40–60 | ½ | 9.5 | 92 | 10.0 | 90 |
| (5) Herbicide A-crosslinked poly(ethylene oxide) | 80–100 | ½ | 3.5 | 97 | 8.5 | 92 |
| (6) Herbicide A-crosslinked poly(ethylene oxide) | +100 | ½ | 6.0 | 95 | 8.5 | 92 |
| (7) Herbicide A-Spray | | 1 | 18 | | | |
| (8) Herbicide A-crosslinked poly(ethylene oxide) | 10–20 | 1 | 33.5 | | | |
| (9) Herbicide A-crosslinked poly(ethylene oxide) | 20–40 | 1 | 16 | | | |
| (10) Herbicide A-crosslinked poly(ethylene oxide) | 40–60 | 1 | 8.5 | | | |
| (11) Herbicide A-crosslinked poly(ethylene oxide) | 80–100 | 1 | 5.0 | | | |
| (12) Herbicide A-crosslinked poly(ethylene oxide) | +100 | 1 | 1.5 | | | |
| (13) Untreated controls | | | 117.5 | | 99 | |

the same herbicide was also applied to the soil by the technical spray technique described above. In addition an untreated control run was made. The plots after treatment were submitted to normal greenhouse conditions for various periods of time as indicated in Table XV. At the end of this time, the results shown in Table XV above were observed. The data in Table XV were secured by taking the results of an average of two replications.

The data shown in Table XV indicate that the optimum activity of the herbicide when loaded on the activating carrier of the present invention is somewhat dependent upon the particle size of the carrier. Optimum activity when determined on the basis of percent of weed control appeared in this particular instance to be achieved when the carrier was about 40 mesh. Again, in this test it was observed that application of the herbicide via the polymeric carrier contributed to much less loss of the herbicide due to leaching.

In another experiment, a formulation containing as a herbicide the ethanol ester of 2-4-dichlorophenoxy acetic acid in an aqueous solution was sprayed on bean and mustard plants at a rate of one-quarter, one-eighth and one-sixteenth pounds per acre. The same herbicide in an aqueous solution was admixed with crosslinked powdered poly(ethylene oxide) as a carrier. The polymeric carrier in the spray solution incorporated large amounts, up to 100 times its dry weight, of the herbicide containing solution within its polymeric matrix. The polymeric carrier was incorporated in the spray solution at 0.1 and .5 weight percent of the total solution. The polymeric carrier containing solution was sprayed on beans and mustard at a rate of one-quarter, one-eighth and one-sixteenth pound per acre. After 18 days, the plants were examined and the data tabulated in Table XVI were secured. The effectiveness of the herbicide was measured by a scale wherein 0 represented no effect and 5 represented plant death.

TABLE XVI.—HERBICIDE APPLICATION TO FOLIAGE

| Amount of herbicide sprayed in pounds per acre and amount of crosslinked polymeric material in weight percent | Effectiveness | |
|---|---|---|
| | Bean | Mustard |
| ¼ herbicide—no polymeric material | 4.5 | 5 |
| ⅛ herbicide—no polymeric material | 4 | 5 |
| 1/16 herbicide—no polymeric material | 3 | 3 |
| ¼+0.1% crosslinked poly(ethylene oxide) | 5 | 5 |
| ⅛+0.1% crosslinked poly(ethylene oxide) | 3 | 5 |
| 1/16+0.1% crosslinked poly(ethylene oxide) | 3.5 | 4.5 |
| ¼+0.5% crosslinked poly(ethylene oxide) | 5 | 5 |
| ⅛+0.5% crosslinked poly(ethylene oxide) | 3 | 5 |
| 1/16+0.5% crosslinked poly(ethylene oxide) | 4 | 5 |

It is readily apparent from the data in Table XVI above that the herbicide was more effective in all cases where the crosslinked poly(ethylene oxide) carrier was utilized in the spray formulation as a carrier for a large portion of the herbicide containing spray solution.

Active agents such as defoliants are ideally suited for application via the polymeric carrier of the present invention.

Experiments were performed wherein cotton plants were treated by standard spraying techniques with defoliant solutions containing crosslinked poly(ethylene oxide). The crosslinked polymers were added to a spray solution formulation in amounts ranging from about one weight percent to about 0.01 weight percent as noted in Table XV. The crosslinked polymer incorporated up to 100 times its dry weight of the defoliant. The spraying solution contained 1-(5,5,7,7-tetramethyl-2-octenyl)-2-methyl-5-ethyl pyridinium chloride as the defoliant. In addition, spray solutions containing water and crosslinked poly(ethylene oxide) but no defoliant and solutions containing defoliant but no crosslinked polymer materials were also used to treat cotton plants for purposes of comparison. In all the experiments, the defoliant was applied at the rate of about 1.0 pound per acre. The results after 6 days of treating cotton plants with these spray formulations as compared with control are shown in Table XVII below.

TABLE XVII.—APPLICATION OF DEFOLIANTS BY SPRAY TECHNIQUES

| No. | Composition of Spray Solution | Percent Defoliation | |
|---|---|---|---|
| | | Test No. 1 | Test No. 2 |
| 1 | 1 wt. percent crosslinked poly(ethylene oxide) in the defoliant spray solution. | 30 | 7 |
| 2 | 0.5 wt. percent crosslinked poly(ethylene oxide) in the defoliant spray solution. | 100 | 100 |
| 3 | 0.1 wt. percent crosslinked poly(ethylene oxide) in the defoliant spray solution. | 90 | 83 |
| 4 | 0.01 wt. percent crosslinked poly(ethylene oxide) in the defoliant spray solution. | 90 | 36 |
| 5 | No crosslinked poly(ethylene oxide) in the defoliant spray solution. | 45 | 45 |
| 6 | Poly(ethylene oxide) but no defoliant in the spray solution. | 0 | 0 |
| 7 | Untreated Control | 0 | 0 |

The data in Table XVII indicate clearly that the use of the crosslinked polymeric materials of the present invention as carriers for the defoliant spray composition contributes greatly to the effectiveness of the defoliant as an active agent. Run numbers 2–4 indicate that the defoliant is approximately 30 to 90 percent more effective when applied via the polymeric carrier. While a comparison of run number 1 with run numbers 2–4 apparently indicates that there is an optimum amount of crosslinked polymeric material, it is contemplated that this will vary with different defoliants and in different environments.

As pointed out above, there are many instances wherein the insoluble crosslinked matrix containing water and/or fertilizer or other active agents is an ideal growth medium for germination of seeds and/or rooting of plant cuttings. The seeds of beans, lettuce, tomatoes, peppers, petunias, pansies, marigolds and snap dragons have successfully been germinated in the polymeric matrix-water media.

While the various examples set forth in the specification were conducted using crosslinked poly(ethylene oxide) as the polymeric component, the present invention is not limited thereto. The present invention contemplates the use of any of the aforementioned crosslinked polymeric materials as a component in the growth medium formulation or as the carrier in the activated carrier embodiment.

It should be noted that the present crosslinked polymeric materials are not consumed to any significant extent by the plants themselves, but act as inert components in the growth medium or as an inert carrier. Due to their ability to incorporate or sorb organic and inorganic compounds and/or solutions of various solutes in aqueous or organic solvents within their matrix and release these sorbed agents to their surrounding environment under a wide variety of conditions, they have wide utility in the field of agriculture. The active agents are not chemically affected by nor do they react in any significant manner with the crosslinked polymeric materials. The polymeric materials disclosed herein provide a more effective means for achieving the known functions of water and other known active agents or agricultural chemicals.

What we claim is:

1. A plant growth medium comprising: (1) at least one member selected from the group consisting of soil, sand, peat moss and vermiculite, in admixture with (2) from about 0.001 to about 5 weight percent of a particulate, water-insoluble, cross-linked, matrix of polymeric alkylene ether having the ability to reversably sorb and desorb substantial amounts of solutions and suspensions into the polymeric matrix, wherein the alkylene-oxy groups of said polymeric alkylene ether contain from 2 to 8 carbon atoms.

2. A plant growth medium in accordance with claim 1 wherein the polymeric alkylene ether is a homopolymer.

3. A plant growth medium in accordance with claim 1 wherein the polymeric alkylene ether is a copolymer containing at least 75 mol percent ethylene-oxy units.

4. A plant growth medium in accordance with claim 1 wherein the polymeric alkylene ether is polyethylene oxide.

5. A plant growth medium in accordance with claim 1 additionally containing a fertilizer.

6. A plant growth medium in accordance with claim 1 additionally containing a herbicide.

7. A plant growth medium in accordance with claim 1 additionally containing a fungicide.

8. A plant growth medium in accordance with claim 1 additionally containing a nematocide.

9. A plant growth medium in accordance with claim 1 additionally containing an insecticide.

10. A plant growth medium in accordance with claim 1 additionally containing at least one soil conditioning agent.

11. A plant growth medium for use in rooting of plant cuttings and germination of seeds comprising: (1) a particulate, water-insoluble, cross-linked, matrix of polymeric alkylene ether having the ability to reversably sorb and desorb substantial amounts of solutions and suspensions into the polymeric matrix, wherein the alkylene-oxy groups of said polymeric alkylene ether contain from 2 to 8 carbon atoms, (2) water, and (3) a fertilizer.

12. A method of promoting the survival and growth of plants which comprises admixing with the soil in which said plants are grown from about 0.001 to about 5 weight percent of a particulate, water-insoluble, cross-linked, matrix of polymeric alkylene ether having the ability to reversably sorb and desorb substantial amounts of solutions and suspensions into the polymeric matrix, wherein the alkylene-oxy groups of said polymeric alkylene ether contain from 2 to 8 carbon atoms.

13. The method of claim 12 wherein the polymeric alkylene ether is a homopolymer.

14. The method of claim 12 wherein the polymeric alkylene ether is a copolymer containing at least 75 mol percent ethylene-oxy units.

15. The method of claim 12 wherein the polymeric alkylene ether is polyethylene oxide.

16. A method for rendering plants resistant to moisture stress which comprises contacting the roots of said plants with an aqueous slurry of a particulate, water-insoluble, cross-linked, matrix of polymeric alkylene ether having the ability to reversably sorb and desorb substantial amounts of solutions and suspensions into the polymeric matrix, wherein the alkylene-oxy groups of said polymeric alkylene ether contain from 2 to 8 carbon atoms.

17. The method of claim 16 wherein the polymeric alkylene ether is polyethylene oxide.

References Cited

UNITED STATES PATENTS

| | | | |
|---|---|---|---|
| 2,891,355 | 6/1959 | Nelson. | |
| 2,951,753 | 9/1960 | Groves. | |
| 3,000,722 | 9/1961 | Linnolt. | |
| 3,060,084 | 10/1962 | Littler | 71—42 |
| 3,062,634 | 11/1962 | Talbert | 71—2.1 |

FOREIGN PATENTS

| | | |
|---|---|---|
| 762,995 | 12/1956 | Great Britain. |
| 831,344 | 3/1960 | Great Britain. |
| 898,915 | 6/1962 | Great Britain. |

LEWIS GOTTS, *Primary Examiner.*

JULIAN S. LEVITT, JAMES O. THOMAS, ELBERT L. ROBERTS, *Examiners.*

A. J. ADAMCIK, *Assistant Examiner.*